(12) United States Patent
Mazed et al.

(10) Patent No.: US 9,656,769 B2
(45) Date of Patent: May 23, 2017

(54) HEAT SHIELD FOR A SPACECRAFT

(71) Applicants: Mohammad A. Mazed, Chino Hills, CA (US); Rex Wiig, Chino, CA (US); Angel Martinez, Anaheim, CA (US)

(72) Inventors: Mohammad A. Mazed, Chino Hills, CA (US); Rex Wiig, Chino, CA (US); Angel Martinez, Anaheim, CA (US)

(*) Notice: Subject to any disclaimer, the term of this patent is extended or adjusted under 35 U.S.C. 154(b) by 534 days.

(21) Appl. No.: 14/266,158

(22) Filed: Apr. 30, 2014

(65) Prior Publication Data

US 2015/0314894 A1 Nov. 5, 2015
US 2016/0376039 A9 Dec. 29, 2016

Related U.S. Application Data

(60) Provisional application No. 61/854,762, filed on May 1, 2013.

(51) Int. Cl.
*B64G 1/62* (2006.01)
*D03D 15/12* (2006.01)
*D03D 25/00* (2006.01)

(52) U.S. Cl.
CPC .............. *B64G 1/62* (2013.01); *D03D 15/12* (2013.01); *D03D 25/005* (2013.01); *D10B 2101/12* (2013.01); *D10B 2101/14* (2013.01)

(58) Field of Classification Search
CPC .................................... B64G 1/58; B64G 1/62
USPC .................. 244/121, 171.7; 250/238; 252/62
See application file for complete search history.

(56) References Cited

U.S. PATENT DOCUMENTS

| | | | | |
|---|---|---|---|---|
| 4,964,597 A | * | 10/1990 | Hijazi | B64G 1/12 244/159.4 |
| 5,736,232 A | * | 4/1998 | Shih et al. | 428/210 |
| 6,558,785 B1 | * | 5/2003 | Rawal et al. | 428/312.8 |
| 7,931,962 B1 | * | 4/2011 | Willcockson et al. | 428/312.8 |
| 8,257,826 B1 | * | 9/2012 | Zinn et al. | 428/314.4 |
| 8,367,178 B1 | * | 2/2013 | Rawal et al. | 428/47 |
| 8,405,057 B1 | * | 3/2013 | Kinstler | 250/515.1 |
| 2003/0164427 A1 | * | 9/2003 | Glatkowski | B64G 1/226 244/171.7 |
| 2005/0272856 A1 | * | 12/2005 | Cooper | B82Y 30/00 524/496 |
| 2007/0224407 A1 | * | 9/2007 | Covington et al. | 428/292.1 |
| 2008/0000168 A1 | * | 1/2008 | Bigelow | B64G 1/52 52/2.11 |
| 2011/0177322 A1 | * | 7/2011 | Ogrin | B82Y 30/00 428/325 |
| 2012/0068160 A1 | * | 3/2012 | Yamazaki | B82Y 10/00 257/29 |
| 2012/0208008 A1 | * | 8/2012 | Tour | B82Y 30/00 428/336 |

(Continued)

FOREIGN PATENT DOCUMENTS

WO    WO 2014171931 A1 * 10/2014 ....... H01L 21/02527

OTHER PUBLICATIONS

Hogue, Michael D., "Regolith-Derived Heat Shield for Planetary Body Entry and Descent System with In-Situ Fabrication", presented at the NIAC Symposium on Mar. 27-29, 2012, <https://www.nasa.gov/pdf/636898main_Hogue_Presentation.pdf>.*

*Primary Examiner* — Michael Wang

(57) ABSTRACT

Various material compositions of a heat shield for a spacecraft are described. The heat shield can be formed by multi-dimensional weaver or three-dimensional (3-D) printer. Furthermore, the heat shield can be configured with a superconducting coil.

20 Claims, 3 Drawing Sheets

(56) References Cited

U.S. PATENT DOCUMENTS

2013/0287984 A1* 10/2013 Kemp .................... B64G 1/22
  428/36.9
2014/0134092 A1* 5/2014 Shankman ............ B82Y 30/00
  423/415.1

* cited by examiner

3-D PRINTING

HEAT SHIELD FOR A SPACECRAFT

CROSS REFERENCE OF RELATED APPLICATION

The present application claims priority to U.S. Provisional Patent Application No. 61/854,762 entitled, Heat Shield For A Spacecraft, filed on May 1, 2013.

FIELD OF THE INVENTION

The present invention generally relates to a heat shield, and more particularly, to a heat shield for minimizing heat transfer to a spacecraft, during atmospheric reentry.

BACKGROUND OF THE INVENTION

A high-pressure bow shock wave can be caused by a spacecraft flying at a hypersonic/high supersonic speed. An extreme heat experienced by the spacecraft is caused by a high-pressure bow shock wave in front of the spacecraft, during atmospheric reentry.

The high-pressure bow shock is where the atmosphere is rapidly compressed by a factor of 50 to 100 depending on the speed of the spacecraft. Because of this rapid compression, the gas is heated to temperatures of about 2000° C. to 2500° C. This hot gas impinges on the front of the spacecraft, transferring the extreme heat to the front surface of the spacecraft.

One way to withstand the extreme heat harmlessly is by ablation (melting/vaporizing/breaking off layers of materials). Another way to withstand the extreme heat harmlessly is by dissipation rather than ablation.

Many heat shield concepts for minimizing heat transfer to the spacecraft structure, during atmospheric reentry are known. However, known heat shields comprised of carbon phenolic are relatively heavy and cause a significant weight penalty to the spacecraft. Conventional carbon-carbon heat shields have a relatively high thermal conductivity, which can cause overheating at the heat shield-spacecraft structure interface, during atmospheric reentry.

Some available heat shield materials, such as phenolic impregnated carbon ablator (PICA) have manufacturing limitations and surface pressure limitation.

SUMMARY OF THE INVENTION

In view of the foregoing, one objective of the present invention is to enable a lightweight heat shield, enabling minimum heat transfer to a spacecraft, during atmospheric reentry and this is realized by utilizing a combination of material compositions (with or without nanomaterials), formation of the heat shield and superconducting coil.

DETAIL DESCRIPTION OF THE DRAWINGS

Figure 1:
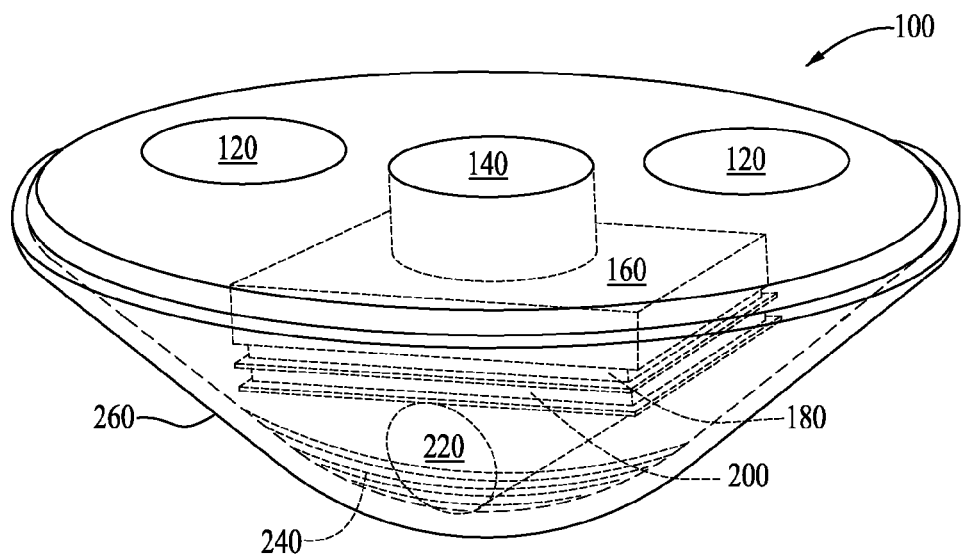
FIG. 1 illustrates a spacecraft.

FIG. 1 illustrates a spacecraft 100. 120 denotes an antenna subsystem. 140 denotes a parachute subsystem. 160 denotes a communication subsystem. 180 denotes a command-sensor subsystem (including a data handling subsystem). 200 denotes a location tracking subsystem. 220 denotes a propulsion/powering subsystem [e.g., (a) an ion propulsion or (b) a fusion propulsion or (c) an antiproton-catalyzed microfission/microfusion propulsion or (d) a plasmonic force propulsion and/or (e) a solar sail]. 240 denotes a super conducting coil. 260 denotes a heat shield.

In a plasmonic force propulsion, sunlight is focused onto an array of metallic nanostructures by a lens. The gap between the array of deep sub-wavelength metallic nanostructures contains nanoparticles (e.g., 100 nm diameter glass beads or 100 nm diameter metallic nanoparticles). Resonant interaction and coupling of light with the nanostructure excites surface plasmon polaritons that generate a strong gradient optical force field. Thus, the nanoparticles are being accelerated by the strong gradient optical force field and expelled at a very high speed.

A solar sail can acquire sunlight for a propulsion/powering subsystem by means of a large membrane of radiation-hardened thin-film solar cells, in addition to acceleration by solar radiation.

Furthermore, a plasmonic force propulsion can be integrated with a solar sail.

An ion propulsion system with a high specific impulse can be driven by the large membrane of radiation-hardened thin-film solar cells.

Thus the large membrane of radiation-hardened thin-film solar cells can act as a hybrid engine with photon acceleration to realize fuel effective and flexible space missions.

Furthermore, the spacecraft 100 can be a micro-spacecraft.

The structural material of the spacecraft 100 can be a carbon-carbon composite with embedded graphene (or graphene like nanomaterial) of a suitable amount.

As gas heats up in front of the spacecraft 100, the shaped magnetic field from the superconducting coil 240 can deflect hot gas away from the spacecraft 100, thus reducing absolute reliance on the heat shield 260.

The superconducting coil 240 can also reduce the weight of the spacecraft 100.

Figure 2:
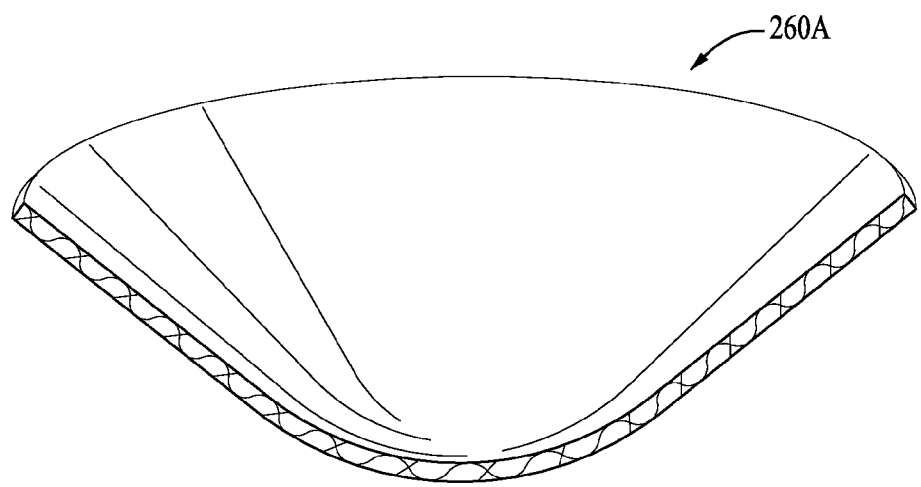
FIG. 2 illustrates a fixed embodiment of a heat shield.

FIG. 2 illustrates a fixed embodiment of the heat shield, denoted as 260A.

Figures 3A, 3B, 3C:
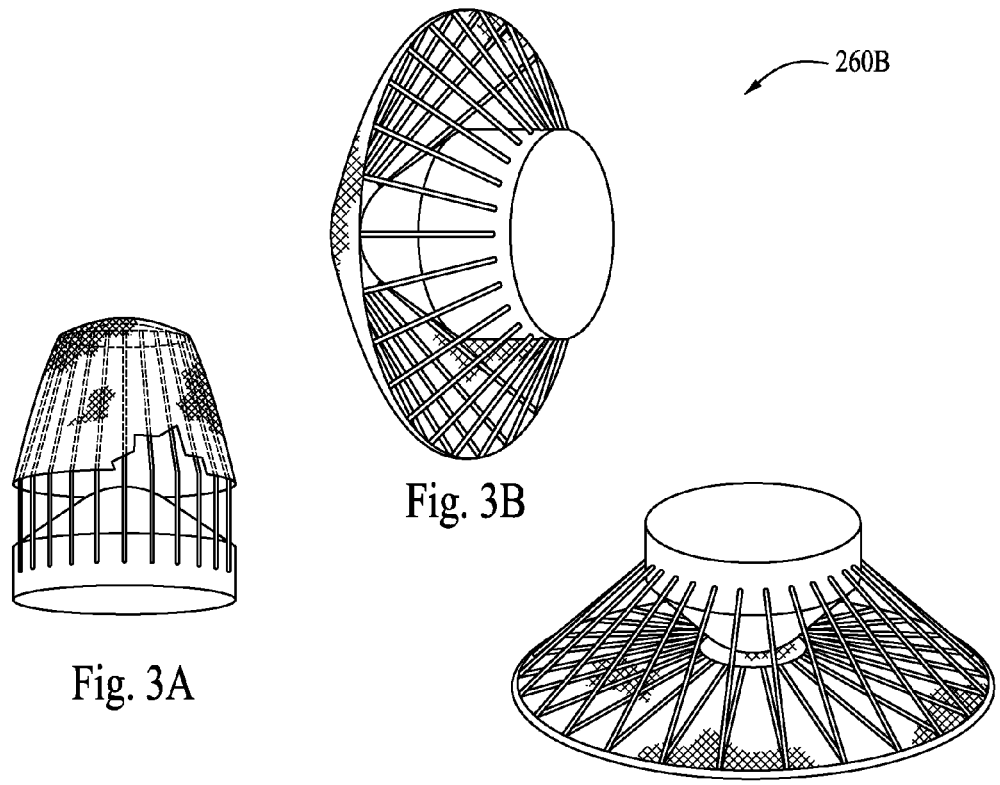
FIGS. 3A, 3B and 3C illustrate various stages of a mechanically deployable heat shield.

FIGS. 3A, 3B and 3C illustrate various stages of the mechanically deployable heat shield, denoted as 260B.

FIG. 3A illustrates a pre-deployed stage of the heat shield 260B. FIG. 3B illustrates a deployed stage of the heat shield 260B. FIG. 3C illustrates a post-deployed stage of the heat shield 260B.

Material Compositions of a Heat Shield for a Spacecraft

A hollow microsphere (e.g., cenospheres/ceramic/glass/phenolic/plastic of about 10 μm to 100 μm in diameter) can reduce the weight of a material. A suitable hollow phenolic microsphere can be carbonized to produce a carbon sphere. Furthermore, titanium dioxide ($TiO_2$)/silver multilayer coating on a suitable hollow microsphere can reduce radar delectability/visibility.

A nanofoam of a honeycomb/porous structure (% pore is about 50% to 75% of a structure and pore size is about 10 nm to 10 μm) can replace a hollow microsphere. A syntactic microfoam is an engineered matrix of polymeric resin with a hollow microsphere/nanoform. A syntactic microfoam can replace a hollow microsphere.

Various compositions are described below is to reduce weight of the heat shield 260 and improve the heat shielding characteristics of the heat shield 260 (including the heat shield embodiments: 260A and 260B).

Various Compositions of Carbon Phenolic Material

One embodiment is carbon phenolic added with 0.1 wt % to 10 wt % of a suitable hollow microsphere.

Another embodiment is carbon phenolic added with 0.1 wt % to 10 wt % of a suitable syntactic microfoam.

Another embodiment is carbon phenolic added with (a) 0.1 wt % to 10 wt % of a suitable hollow microsphere and (b) 0.1 wt % to 10 wt % of graphene.

Another embodiment is carbon phenolic added with (a) 0.1 wt % to 10 wt % of a suitable hollow microsphere and (b) 0.1 wt % to 10 wt % of graphene nanoribbons.

Another embodiment is carbon phenolic added with (a) 0.1 wt % to 10 wt % of a suitable syntactic microfoam and (b) 0.1 wt % to 10 wt % of graphene.

Another embodiment is carbon phenolic added with (a) 0.1 wt % to 10 wt % of a suitable syntactic microfoam and (b) 0.1 wt % to 10 wt % of graphene nanoribbons.

Another embodiment is carbon phenolic added with (a) 0.1 wt % to 10 wt % of a suitable hollow microsphere and (b) 0.1 wt % to 10 wt % of single-walled carbon nanotube.

Another embodiment is carbon phenolic added with (a) 0.1 wt % to 10 wt % of a suitable syntactic microfoam and (b) 0.1 wt % to 10 wt % of single-walled carbon nanotube.

Another embodiment is carbon phenolic added with (a) 0.1 wt % to 10 wt % of a suitable hollow microsphere and (b) 0.1 wt % to 10 wt % of multi-walled carbon nanotube.

Another embodiment is carbon phenolic added with (a) 0.1 wt % to 10 wt % of a suitable syntactic microfoam and (b) 0.1 wt % to 10 wt % of multi-walled carbon nanotube.

Another embodiment is carbon phenolic added with (a) 0.1 wt % to 10 wt % of a suitable hollow microsphere, (b) 0.1 wt % to 10 wt % of graphene and (c) 0.1 wt % to 10 wt % of single-walled carbon nanotube.

Another embodiment is carbon phenolic added with (a) 0.1 wt % to 10 wt % of a suitable syntactic microfoam, (b) 0.1 wt % to 10 wt % of graphene and (c) 0.1 wt % to 10 wt % of single-walled carbon nanotube.

Another embodiment is carbon phenolic added with (a) 0.1 wt % to 10 wt % of a suitable hollow microsphere, (b) 0.1 wt % to 10 wt % of graphene and (c) 0.1 wt % to 10 wt % of multi-walled carbon nanotube.

Another embodiment is carbon phenolic added with (a) 0.1 wt % to 10 wt % of a suitable syntactic microfoam, (b) 0.1 wt % to 10 wt % of graphene and (c) 0.1 wt % to 10 wt % of multi-walled carbon nanotube.

Various Compositions of Carbon Phenolic-C/SiC Matrix Material

C/SiC Refers to Silicon Carbide Reinforced by Carbon Fibers

Furthermore, single-walled/multi-walled carbon nanotubes can be inserted into a carbon fiber(s). Alternatively, single-walled carbon nanotubes can be replaced by boron nitride nanotube/boron-carbon nitride (BxCyNz) nanotubes.

One embodiment is carbon phenolic-C/SiC matrix material added with 0.1 wt % to 10 wt % of a suitable hollow microsphere.

Another embodiment is carbon phenolic-C/SiC matrix material added with 0.1 wt % to 10 wt % of a suitable syntactic microfoam.

Another embodiment is carbon phenolic-C/SiC matrix material added with (a) 0.1 wt % to 10 wt % of a suitable hollow microsphere and (b) 0.1 wt % to 10 wt % of graphene.

Another embodiment is carbon phenolic-C/SiC matrix material added with (a) 0.1 wt % to 10 wt % of a suitable hollow microsphere and (b) 0.1 wt % to 10 wt % of graphene nanoribbons.

Another embodiment is carbon phenolic-C/SiC matrix material added with (a) 0.1 wt % to 10 wt % of a suitable syntactic microfoam and (b) 0.1 wt % to 10 wt % of graphene.

Another embodiment is carbon phenolic-C/SiC matrix material added with (a) 0.1 wt % to 10 wt % of a suitable syntactic microfoam and (b) 0.1 wt % to 10 wt % of graphene nanoribbons.

Another embodiment is carbon phenolic-C/SiC matrix material added with (a) 0.1 wt % to 10 wt % of a suitable hollow microsphere and (b) 0.1 wt % to 10 wt % of single-walled carbon nanotube.

Another embodiment is carbon phenolic-C/SiC matrix material added with (a) 0.1 wt % to 10 wt % of a suitable syntactic microfoam and (b) 0.1 wt % to 10 wt % of single-walled carbon nanotube.

Another embodiment is carbon phenolic-C/SiC matrix material added with (a) 0.1 wt % to 10 wt % of a suitable hollow microsphere and (b) 0.1 wt % to 10 wt % of multi-walled carbon nanotube.

Another embodiment is carbon phenolic-C/SiC matrix material added with (a) 0.1 wt % to 10 wt % of a suitable syntactic microfoam and (b) 0.1 wt % to 10 wt % of multi-walled carbon nanotube.

Another embodiment is carbon phenolic-C/SiC matrix material added with (a) 0.1 wt % to 10 wt % of a suitable hollow microsphere, (b) 0.1 wt % to 10 wt % of graphene and (c) 0.1 wt % to 10 wt % of single-walled carbon nanotube.

Another embodiment is carbon phenolic-C/SiC matrix material added with (a) 0.1 wt % to 10 wt % of a suitable syntactic microfoam, (b) 0.1 wt % to 10 wt % of graphene and (c) 0.1 wt % to 10 wt % of single-walled carbon nanotube.

Another embodiment is carbon phenolic-C/SiC matrix material added with (a) 0.1 wt % to 10 wt % of a suitable hollow microsphere, (b) 0.1 wt % to 10 wt % of graphene and (c) 0.1 wt % to 10 wt % of multi-walled carbon nanotube.

Another embodiment is carbon phenolic-C/SiC matrix material added with (a) 0.1 wt % to 10 wt % of a suitable syntactic microfoam, (b) 0.1 wt % to 10 wt % of graphene and (c) 0.1 wt % to 10 wt % of multi-walled carbon nanotube.

Various Compositions of Carbon Phenolic-C/[GC]/SiCN Matrix Material

C[GC]SiCN Refers to Silicon Carbon Nitride Reinforced by Carbon Fibers with Glassy Carbon [GC] Interface Furthermore, single-walled/multi-walled carbon nanotubes can be inserted into a carbon fiber(s). Alternatively, single-walled carbon nanotubes can be replaced by boron nitride nanotube/boron-carbon nitride (BxCyNz) nanotubes.

One embodiment is carbon phenolic-C/SiCN matrix material added with 0.1 wt % to 10 wt % of a suitable hollow microsphere.

Another embodiment is carbon phenolic-C/SiCN matrix material added with 0.1 wt % to 10 wt % of a suitable syntactic microfoam.

Another embodiment is carbon phenolic-C/SiCN matrix material added with (a) 0.1 wt % to 10 wt % of a suitable hollow microsphere and (b) 0.1 wt % to 10 wt % of graphene.

Another embodiment is carbon phenolic-C/SiCN matrix material added with (a) 0.1 wt % to 10 wt % of a suitable hollow microsphere and (b) 0.1 wt % to 10 wt % of graphene nanoribbons.

Another embodiment is carbon phenolic-C/SiCN matrix material added with (a) 0.1 wt % to 10 wt % of a suitable syntactic microfoam and (b) 0.1 wt % to 10 wt % of graphene.

Another embodiment is carbon phenolic-C/SiCN matrix material added with (a) 0.1 wt % to 10 wt % of a suitable syntactic microfoam and (b) 0.1 wt % to 10 wt % of graphene nanoribbons.

Another embodiment is carbon phenolic-C/SiCN matrix material added with (a) 0.1 wt % to 10 wt % of a suitable hollow microsphere and (b) 0.1 wt % to 10 wt % of single-walled carbon nanotube.

Another embodiment is carbon phenolic-C/SiCN matrix material added with (a) 0.1 wt % to 10 wt % of a suitable syntactic microfoam and (b) 0.1 wt % to 10 wt % of single-walled carbon nanotube.

Another embodiment is carbon phenolic-C/SiCN matrix material added with (a) 0.1 wt % to 10 wt % of a suitable hollow microsphere and (b) 0.1 wt % to 10 wt % of multi-walled carbon nanotube.

Another embodiment is carbon phenolic-C/SiCN matrix material added with (a) 0.1 wt % to 10 wt % of a suitable syntactic microfoam and (b) 0.1 wt % to 10 wt % of multi-walled carbon nanotube.

Another embodiment is carbon phenolic-C/SiCN matrix material added with (a) 0.1 wt % to 10 wt % of a suitable hollow microsphere, (b) 0.1 wt % to 10 wt % of graphene and (c) 0.1 wt % to 10 wt % of single-walled carbon nanotube.

Another embodiment is carbon phenolic-C/SiCN matrix material added with (a) 0.1 wt % to 10 wt % of a suitable syntactic microfoam, (b) 0.1 wt % to 10 wt % of graphene and (c) 0.1 wt % to 10 wt % of single-walled carbon nanotube.

Another embodiment is carbon phenolic-C/SiCN matrix material added with (a) 0.1 wt % to 10 wt % of a suitable hollow microsphere, (b) 0.1 wt % to 10 wt % of graphene and (c) 0.1 wt % to 10 wt % of multi-walled carbon nanotube.

Another embodiment is carbon phenolic-C/SiCN matrix material added with (a) 0.1 wt % to 10 wt % of a suitable syntactic microfoam, (b) 0.1 wt % to 10 wt % of graphene and (c) 0.1 wt % to 10 wt % of multi-walled carbon nanotube.

Furthermore, graphene can be replaced by a graphene flake/graphene foam/graphene platelet/graphene scaffold. Also graphene can be replaced by a graphene oxide platelet/graphene oxide nanoribbon.

Furthermore, any embodiment described in previous paragraphs can be multi-layered with a ceramic material such as: (a) SiCN or (b) $HfB_2$/SiC or (c) $HfB_2$/HfC or (d) $ZrB_2$/SiC or (e) $Ti_2AlC$ or (d) a light silicate frame material such as: wollastonite.

Forming a Heat Shield for a Spacecraft

Single-walled/multi-walled carbon nanotubes can be inserted into a carbon fiber by electrospinning process.

Ceramic materials and/or light silicate frame material can be formed by hot pressure-less sintering and machined into a desired shape by electro-erosion.

Furthermore, tape wrap or chop molding can be utilized for forming the heat shield 260 (including both embodiments 260A and 260B).

Figure 4:
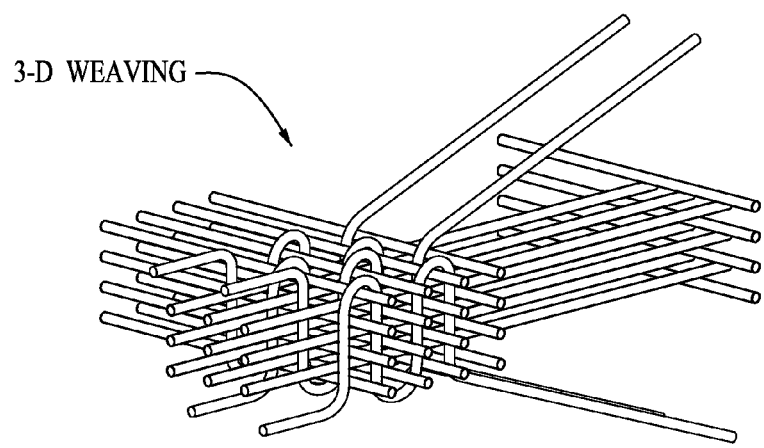
FIG. 4 illustrates a heat shield enabled by a multidimensional weaver.

FIG. 4 illustrates multi-dimensional weaving [e.g., three dimensional (3-D)] weaving of a material, described in previous paragraphs for forming the heat shield 260 (including both embodiments 260A and 260B).

The multi-dimensional woven heat shield has design flexibility and versatility, inherent resistance to delamination, improved damage tolerance, ability to tailor material properties to the application, near net-shape preform capabilities and reduced lay-up complexity and handling time. The multi-dimensional woven heat shield is reinforced in multiple directions, including the through-thickness direction. Unlike conventional laminated materials, which are typically only reinforced in the plane of the lamination, the multi-dimensional woven heat shield can exhibit different material properties in different directions. For example, the three dimensional (3-D) woven heat shield might have increased axial stiffness in one area and greater shear strength in another area.

Figure 5:
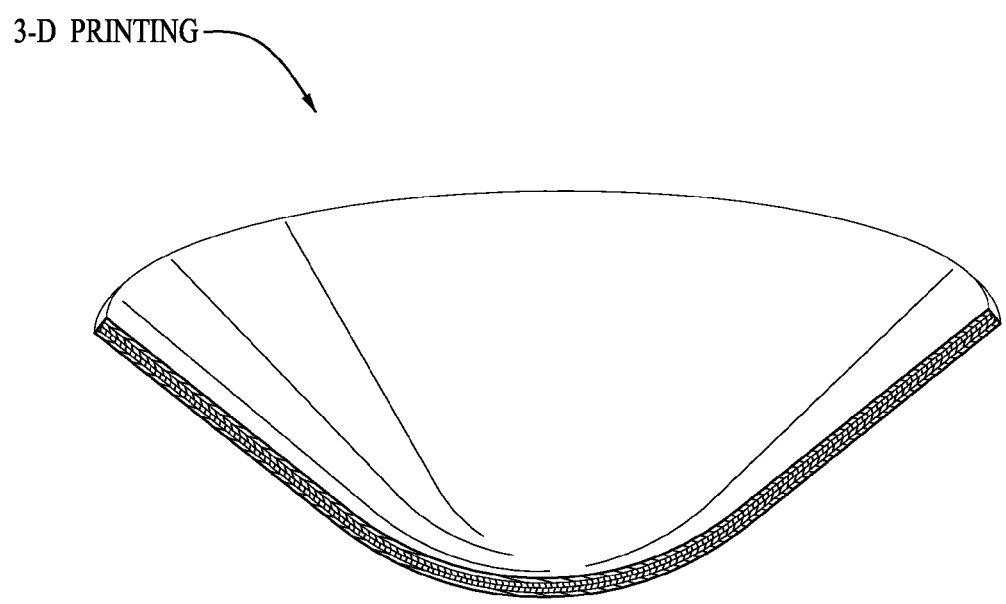
FIG. 5 illustrates a heat shield enabled by a three dimensional (3-D) printer.

FIG. 5 illustrates three dimensional (3-D) printing of a material, described in previous paragraphs for forming the heat shield 260 (including both embodiments 260A and 260B).

The three-dimensional (3-D) printing is an additive process, which means that a three-dimensional (3-D) solid object can be formed by adding material in layers. This is in sharp contrast to current subtractive process, through which an object is formed by cutting (or machining) raw material into a desired shape. After a design file is sent to a three-dimensional (3-D) printer, one can choose a set of specific materials (e.g., composites, metals and plastic). In the three-dimensional (3-D) printing, the materials are usually sprayed, squeezed or otherwise transferred from the three-dimensional (3-D) printer onto a platform. Then, the three-dimensional (3-D) printer makes passes (much like an inkjet printer) over the platform, depositing layer on top of layer of material to create the finished the heat shield 260 (including embodiments 260A and 260B). The average thickness of a three-dimensional (3-D) printed layer is about 15 μm to 100 μm.

In Situ Planetary Forming of a Heat Shield for a Spacecraft

The spacecraft 100 may leave the earth with a superconducting coil as thermal protection, but without a formal heat shield 260. Then upon arrival in another planet, the spacecraft 100 can assemble a heat shield 260, utilizing an in situ planetary material and an in situ three-dimensional (3-D) printing, before returning to the earth.

The in situ three-dimensional (3-D) printing can be performed in vacuum. The in situ planetary material can be manipulated by a robot for the in situ three-dimensional (3-D) printer.

The in situ planetary material can be added with a hollow microsphere/syntactic microfoam.

The in situ planetary material can be added with material described in previous paragraphs.

The in situ planetary material can be added with a nanostructural material(s) (e.g., graphene/graphene related material/single-walled/multi-walled carbon nanotube/boron nitride nanotube/boron-carbon nitride (BxCyNz) nanotube) of suitable amount. Furthermore, the in situ planetary material can be added with ceramic/light silicate frame of suitable amount.

In the above disclosed specifications "/" has been used to indicate an "or". Any example in the above disclosed specifications is by way of an example and not by way of any limitation.

Unless and otherwise specifically indicated, all the terms in the above disclosed specifications have a plain meaning for a person ordinary skilled in the art/subject matter.

The above disclosed specifications are the preferred embodiments of the present invention. However, they are not intended to be limiting only to the preferred embodiments of the present invention. Numerous variations and/or modifications are possible within the scope of the present invention. Accordingly, the disclosed preferred specifications are to be construed as illustrative specifications only. Those who are skilled in the art/subject matter can make various variations and/or modifications without departing from the scope and spirit of this invention. Therefore, the scope and spirit of this invention shall be defined by the claims and the equivalents of the claims only. The exclusive use of all variations and/or modifications within the scope of the claims is reserved.

We claim:

1. A spacecraft;
a heat shield for minimizing heat transfer to the spacecraft; the heat shield comprising:
    (a) a carbon phenolic material; and
    (b) a nanostructural material, wherein the nanostructural material comprises: graphene in an amount of 0.1 wt % to 10 wt % and graphene nanoribbons in an amount of 0.1 wt % to 10 wt %.

2. The spacecraft of claim 1, wherein the heat shield further comprises: a hollow microsphere or a syntactic microfoam.

3. The spacecraft of claim 1, wherein the heat shield further comprises: a ceramic material.

4. The spacecraft of claim 1, wherein the heat shield further comprises: a light silicate frame material.

5. The spacecraft of claim 1, wherein the heat shield further comprises: a superconducting coil.

6. A spacecraft;
a heat shield for minimizing heat transfer to the spacecraft; the heat shield comprising:
    (a) a matrix material, wherein the matrix material comprises: a carbon phenolic material and a silicon carbide material, wherein the silicon carbide material comprises: carbon fibers; and
    (b) a nanostructural material, wherein the nanostructural material comprises: graphene in an amount of 0.1 wt % to 10 wt % and graphene nanoribbons in an amount of 0.1 wt % to 10 wt %.

7. The spacecraft of claim 6, wherein the heat shield further comprises: a hollow microsphere or a syntactic microfoam.

8. The spacecraft of claim 6, wherein the heat shield further comprises: a ceramic material.

9. The spacecraft of claim 6, wherein the heat shield further comprises: a light silicate frame material.

10. The spacecraft of claim 6, wherein the heat shield further comprises: a superconducting coil.

11. A spacecraft;
a heat shield for minimizing heat transfer to the spacecraft; the heat shield comprising:
    (a) a matrix material, wherein the matrix material comprises: a carbon phenolic material and a silicon carbon nitride material, wherein the silicon carbon nitride material comprises: carbon fibers; and
    (b) a nanostructural material, wherein the nanostructural material comprises: graphene in an amount of 0.1 wt % to 10 wt % and graphene nanoribbons in an amount of 0.1 wt % to 10 wt %.

12. The spacecraft of claim 11, wherein the heat shield further comprises: a hollow microsphere or a syntactic microfoam.

13. The spacecraft of claim 11, wherein the heat shield further comprises: a ceramic material.

14. The spacecraft of claim 11, wherein the heat shield further comprises: a light silicate frame material.

15. The spacecraft of claim 11, wherein the heat shield further comprises: a superconducting coil.

16. A spacecraft;
a heat shield for minimizing heat transfer to the spacecraft; the heat shield comprising:
    (a) an in-situ planetary material; and
    (b) a first nanostructural material, wherein the in-situ planetary material is not from planet earth, wherein the first nanostructural material comprises: graphene in an amount of 0.1 wt % to 10 wt % and graphene nanoribbons in an amount of 0.1 wt % to 10 wt %.

17. The spacecraft of claim 16, wherein the heat shield further comprises: a hollow microsphere or a syntactic microfoam.

18. The spacecraft of claim 16, wherein the heat shield further comprises: a second nanostructural material.

19. The spacecraft of claim 16, wherein the heat shield further comprises: a ceramic material.

20. The spacecraft of claim 16, wherein the heat shield further comprises: a superconducting coil.

* * * * *